United States Patent [19]

Kiefer et al.

[11] 4,113,393
[45] Sep. 12, 1978

[54] APPARATUS FOR MEASURING CASTER AND CAMBER IN MOTOR VEHICLES

[75] Inventors: Udo Kiefer; Wolf von Loeben; Friedrich Wilhelm Schulz, all of Karlsruhe, Germany

[73] Assignee: Siemens Aktiengesellschaft, Berlin & Munich, Germany

[21] Appl. No.: 783,407

[22] Filed: Mar. 31, 1977

[30] Foreign Application Priority Data

Apr. 2, 1976 [DE] Fed. Rep. of Germany ....... 2614374

[51] Int. Cl.² .......................................... G01B 11/275
[52] U.S. Cl. ................................................. 356/155
[58] Field of Search ....................... 356/153, 154, 155

[56] References Cited

U.S. PATENT DOCUMENTS

| 3,630,623 | 12/1971 | Schirmer | 356/155 |
| 3,756,724 | 9/1973 | Schirmer | 356/155 |
| 3,782,831 | 1/1974 | Senften | 356/155 |
| 3,888,592 | 6/1975 | Geul | 356/155 |

Primary Examiner—John K. Corbin
Assistant Examiner—R. A. Rosenberger
Attorney, Agent, or Firm—Kenyon & Kenyon, Reilly, Carr & Chapin

[57] ABSTRACT

An apparatus for measuring caster and camber in a motor vehicle including a mirror which is mountable on the respective hubs of the vehicle wheels and the normal to which is directed parallel to the wheel axles of the vehicles. A projector is disposed opposite the mirror and a projection surface is provided including a plurality of light-sensitive detectors for detecting images of horizontally-vertically oriented shutters disposed in the ray path of the projector reflected by the mirror. The improvement of the invention comprises the shutters comprising measuring edges of rotatable arms disposed in an object plane of the projector. The angles or rotation of the arms between a reference position and a position of the arms at which an image of one of the measuring edges reflected by the mirror onto at least one detector are used to measure the caster and camber angles of the wheels of the vehicle.

17 Claims, 2 Drawing Figures

APPARATUS FOR MEASURING CASTER AND CAMBER IN MOTOR VEHICLES

BACKGROUND OF THE INVENTION

1. Field of the Invention

This invention relates to an improved apparatus for measuring caster and camber angles in motor vehicles.

2. Description of the Prior Art

Apparatus for measuring the caster and camber angles in motor vehicles comprising a mirror attached to the respective hubs of the wheels of the vehicle and the normal to which mirror is disposed parallel to the wheel axles and including a projector disposed opposite the mirror and a projection surface having a light-sensitive detector for detecting images of horizontally-vertically oriented shutters disposed in the ray path of the projector which are reflected by the mirror are known in the art. See, for example, U.S. Pat. No. 3,630,623.

In the apparatus described in the aforementioned patent, the horizontally-vertically oriented shutters disposed in the ray path of the projector consist of a pattern comprising light-transparent and opaque strips disposed on a movable plate. In order to measure the caster and camber angles, the plate is displaced between bars provided in the projector of the apparatus. Of course, the device used to move the plate permits only a limited displacement velocity so that for automated operation of the angle measurement, considerable time is required. In addition, resolution of the angle measurement and, thus, its accuracy, depends upon the division of the pattern into light-transparent and opaque strips. Naturally, limits are placed upon the fineness of the pattern.

SUMMARY OF THE INVENTION

It is an object of the present invention to overcome the aforementioned disadvantages of heretofore known prior art devices and to provide an improved apparatus for measuring caster and camber in motor vehicles which considerably increases the speed of the angle measurement over prior art measuring devices and which permits the formation of averages from several caster and camber angle measurements.

It is also an object of the present invention to provide an improved apparatus for measuring caster and camber in motor vehicles which improves the resolution of the angle measurement over that of prior art devices.

It is still another object of the present invention to provide an improved apparatus for measuring caster and camber in motor vehicles to provide a displacement mechanism for the shutters of the apparatus which is as simple as possible.

These and other objects of the invention are achieved in an apparatus for measuring caster and camber in a motor vehicle including a mirror which is mountable on the respective hubs of the vehicle wheels and the normal to which is directed parallel to the wheel axles of the vehicle; a projector disposed opposite the mirror; and a projection surface including a plurality of light-sensitive detectors for detecting images of horizontally-vertically oriented shutters disposed in the ray path of the projector reflected by the mirror. The improvement of the invention comprises the shutters comprising measuring edges of rotatable arms disposed in an object plane of the projector, the angles of rotation of the arms between a reference position and a position of the arms at which an image of one of the measuring edges is reflected by the mirror onto at least one of the detectors of the apparatus being used as a measurement of (i.e., serve as a measure of) the caster and camber angles of the wheels of the vehicle.

A simple drive mechanism is sufficient for rotating the measuring edges and arms of the apparatus of the invention, the speed of which can be increased almost arbitrarily without generating friction resistance between a plate and slide bars. The arrangement of the invention makes it possible to relate the angle measurement to a time measurement and to thereby achieve almost any resolution desired. The reference position of the measuring edges is preferably determined by a light gate disposed in the object plane of the projector.

When measuring the camber angle, a slight dependence of the angle measurement on the mutual distance between the mirror and the projector can occur due to various circumstances. It is, therefore, preferable to include means in the apparatus for measuring the distance between the projector and the mirror at the same time. In a preferred embodiment of the invention, the apparatus includes two additional light-sensitive detectors disposed on the projection surface of the apparatus at a mutual distance and the angle of rotation of the arms from a position at which an image of one of the measuring edges is reflected by the mirror onto one of the additional detectors to another position at which the image of the same edge is reflected by the mirror onto the other of the two detectors is used to measure the distance of the mirror from the projector.

The angle of rotation of the arms can be determined if the speed of rotation of the drive mechanism for the arms is known. For this purpose a clock pulse counter is provided which is started by signals generated by the light gate and transmitted through a gate circuit and is shut off by signals generated by the detector by means of the same gate circuit. Between generation of these two signals, the pulse counter receives pulses generated by a clock generator. Where the distance between the projector and the mirror is being measured, the gate circuit is controlled by output signals generated by the two additional detectors.

The shutter measuring edge on which the caster measurement is based is preferably a straight edge of one of the arms which is disposed radially with respect to the axis of rotation of the arms. For camber measurement, a shutter measuring edge which is not disposed radially with respect to the axis of rotation of the arms is sufficient in the most general case. A curved edge is preferably used for camber measurement which is shaped so that the curve intersects at each point thereon vectors originating at the axis of rotation of the arms at an angle of 45°. In one embodiment of the invention, the axis of rotation of the arms is disposed vertically above the optical axis of the projector and both axes are parallel. The arms including the measuring edges for the caster and camber angles are disposed offset with respect to each other by an angle of 180°.

A synchronous motor is preferably used as a drive mechanism for the arms of the measuring apparatus. The speed of rotation of this motor is preferably chosen so high that more than one measurement result per second is always produced for the caster and camber angle measurements. The clock pulse counter is preferably designed so that it can accommodate several angle measurements in time multiplex operation.

In one embodiment of the invention, the light gate is disposed in a vertical plane through the optical axis of the projector. Alternatively, the light gate may be disposed in a vertical plane through the axis of rotation of the arms. A halogen lamp with a cold light mirror may be used as the light source for the projector. The light source is equipped with a lens which images the helix of the halogen lamp in the vicinity of the objective of the projector. A more economical power supply may be provided for the light source, however, if a stroboscopic lamp is used as the light source.

These and other features and advantages of the invention will be described in greater detail in the following detailed description.

BRIEF DESCRIPTION OF THE DRAWINGS

In the drawings, wherein similar reference numerals denote similar elements throughout the several views thereof.

DETAILED DESCRIPTION

Figure 1:
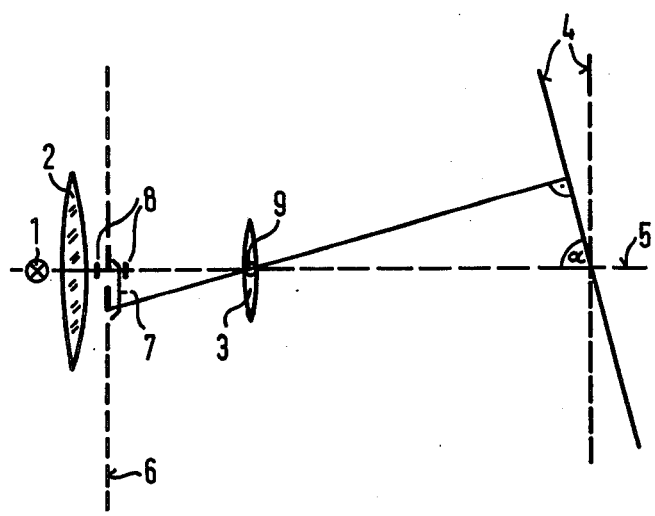
FIG. 1 is a diagrammatic illustration of a ray path between the measuring edges, mirror and detector of an improved apparatus for measuring caster and camber in motor vehicles constructed according to the present inventions.

Referring now to FIG. 1, there is shown a condenser lens 2 and an objective lens 3 disposed in the ray path of a light source 1 of a projector. A mirror 4 is disposed opposite objective lens 3 and is illustrated in two positions. In one position, mirror 4 is disposed at a right angle with respect to the optical axis 5 of the projector. In the other position, the mirror is inclined with respect to axis 5 by an angle $\alpha$. A measuring edge 7, which likewise is shown in two positions, is disposed in the object plane 6 of the projector. In the first position of the measuring edge, edge 7 touches optical axis 5 of the projector. In its second position, measuring edge 7 is disposed below optical axis 5. The two positions of the measuring edge correspond to an angle of rotation of an arm on which the edge is disposed (which is not shown for the purpose of clarity of illustration).

Aligned with optical axis 5 is a light gate 8 comprising a light transmitter and receiver. If the measuring edge touches optical axis 5, a starting signal for a counter is generated, which counter receives pulses from a clock. In the normal position of mirror 4, a reflected ray which images the measuring edge impinges at the same time on a detector 9 disposed vertically above the optical axis of the projector in the plane of the objective lens 3. The counter, thus, receives a stop signal at the same time and no counting pulses are counted. The caster and camber angle at this point is zero. If a caster and camber angle is present, i.e., if the position of mirror 4 is inclined relative to its normal position, the image of the measuring edge is reflected onto the detector only in the second position of the measuring edge below optical axis 5. The clock pulse counter, similar to the previously-described situation, receives a start signal when the measuring edge passes the light gate. The counter then receives and counts clock pulses until the measuring edge is in the second position in which the image of the measuring edge is reflected onto the detector by the inclined mirror and the detector generates a stop signal for the clock pulse counter. The number of clock pulses counted by the counter is proportional to the angle $\alpha$.

Figure 2:
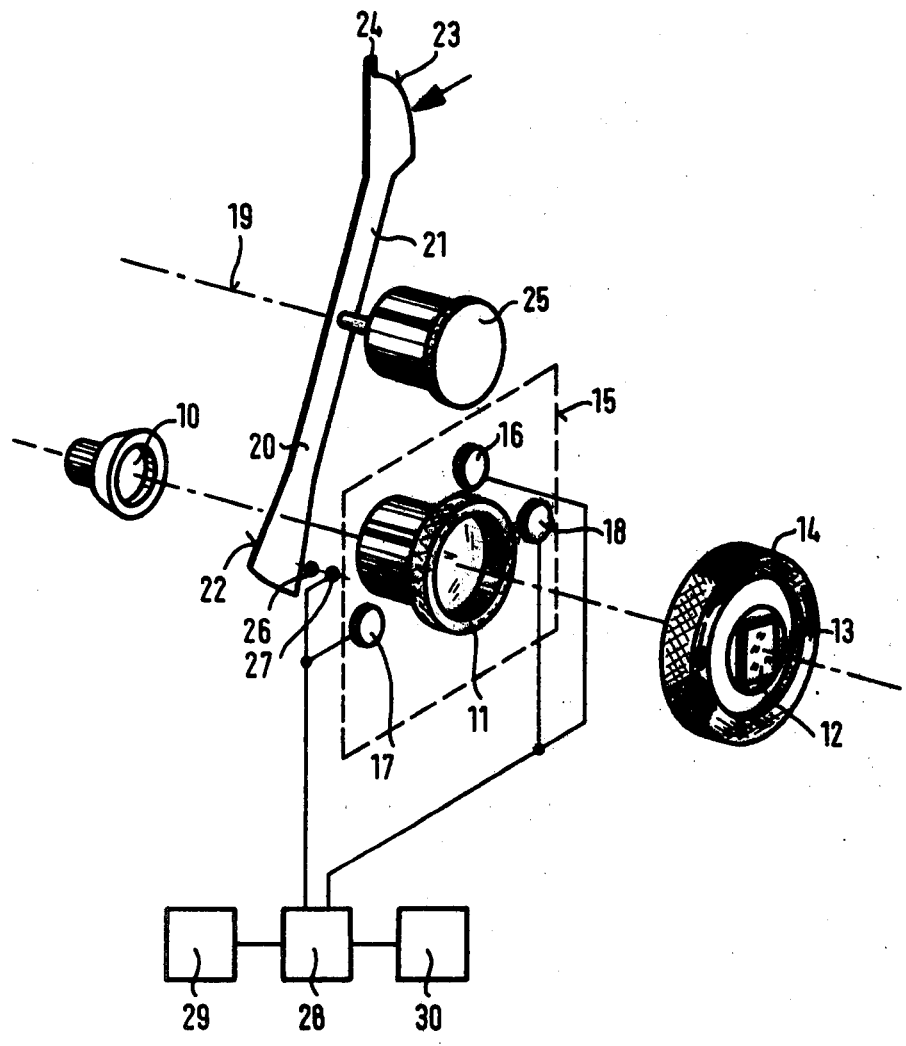
FIG. 2 is a schematic illustration of an improved apparatus for measuring caster and camber in motor vehicles constructed according to the present invention.

One embodiment of the invention is illustrated in FIG. 2. As shown in the FIGURE, a light ray travels from a lamp 10 of the projector through an objective lens 11 to a mirror 12 which is mountable on and attached to a hub 13 of a motor vehicle wheel 14. A projection surface 15 is disposed in the plane of objective lens 11 and includes a detector 16 for measuring caster and camber angles and two additional detectors 17 and 18 for measuring the distance of the mirror from the projector. A pair of arms 20 and 21 having measuring edges 22 and 23 at their ends are disposed in the image plane of the projector and are rotatably mounted about an axis of rotation 19. Measuring edge 22, which is straight, is used to measure the caster angle and measuring edge 23, which has a curved shape, is used to measure the camber angle. A separate camber angle measurement, starting edge 24, is also provided for measuring the camber angle.

Axis of rotation 19 is located vertically above the optical axis of the projector and is disposed parallel to the axis of the projector. Arms 20 and 21 are driven by a synchronous motor 25. During rotation, arms 20 and 21 and measuring edges 22, 23 and 24 pass through a light gate comprising a light transmitter 26 and a light receiver 27. A signal transmission line is coupled to light receiver 27 of the light gate and to a start input terminal of a gate circuit 28. The start input terminal of the gate circuit is also coupled to light detector 17. A stop input terminal of gate circuit 28 is coupled by another signal transmission line to an electrical output terminal of light detector 16. Similarly, light detector 18 is coupled to the stop input terminal of gate circuit 28. A clock generator 29 is coupled to gate circuit 28 and generates pulses which are transmitted through the gate circuit to a clock pulse counter 30 coupled to circuit 28. It should be noted that the output signal generated by light detector 16 may function, by means of a logic circuit (not shown), as a start signal and that the output signal generated by light receiver 27 similarly may function as a stop signal. The sequence of the two output signals will then determine the sign of the angles measured by means of them.

The light detectors may comprise photodiodes or phototransistors. Also, if synchronous motor 25 which drives arms 20 and 21 rotates at a speed of 300 r.p.m., five measurement values per second can be obtained for both the caster and camber angle measurements. Correction of the measurement results that may be required can be made by means of a microprocessor and tables permanently stored therein.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In an apparatus for measuring caster and camber in a motor vehicle including a mirror which is mountable on the respective hubs of the vehicle wheels and the normal to which mirror is directed parallel to the wheel axles of the vehicle; a projector disposed opposite the mirror; and a projection surface including a plurality of light-sensitive detectors for detecting images of horizontally-vertically oriented shutters disposed in the ray path of the projector reflected by the mirror; the improvement comprising said shutters comprising measuring edges of rotatable arms disposed in an object plane of the projector, the angles of rotation of the arms between a reference position and a position of the arms at which an image of one of said measuring edges is reflected by said mirror onto at least one of said detectors being used as a measurement of the caster and camber angles of the wheels of said vehicle.

2. The apparatus recited in claim 1, further comprising a light gate disposed in said object plane of said projector for determining said reference position of said rotatable arms.

3. The apparatus recited in claim 2, wherein said light gate is disposed in a vertical plane through the optical axis of said projector.

4. The apparatus recited in claim 2, wherein said light gate is disposed in vertical plane through the axis of rotation of said arms.

5. The apparatus recited in claim 1, further comprising at least two additional light-sensitive detectors mounted on said projection surface at a common distance from said mirror for measuring the distance of said mirror from said projector, the angle of rotation of said arms from a position of said arms at which an image of one of said measuring edges is reflected by said mirror onto one of said additional detectors and another position of said arms at which said image of said one edge of said measuring edges is reflected onto the other of said additional detectors being indicative of the distance of said mirror from said projector.

6. The apparatus recited in claim 1, wherein the speed of rotation of said arms is predetermined, and further comprising a clock pulse counter for determining the angle of rotation of said arms.

7. The apparatus recited in claim 1, wherein one of said shutter measuring edges comprises a straight edge radially disposed on one of said arms with respect to the axis of rotation of said arms for measuring the caster angle of said vehicle wheels.

8. The apparatus recited in claim 1, wherein one of said shutter measuring edges comprises a non-radial curved edge disposed on one of said arms for measuring the camber angle of said vehicle wheels.

9. The apparatus recited in claim 8, wherein said curved edges is shaped so as to intersect at each point on said edge vectors originating at the axis of rotation of said arms at an angle of 45°.

10. The apparatus recited in claim 1, wherein said arms are rotatable about an axis of rotation disposed vertically above and parallel to the optical axis of said projector.

11. The apparatus recited in claim 1, wherein said arms are disposed at an angle of 180° with respect to each other.

12. The apparatus recited in claim 1, further comprising a synchronous motor for rotating said arms.

13. The apparatus recited in claim 1, further comprising means for rotating said arms at a speed at which more than one measurement per second is made for each caster and camber angle measurement.

14. The apparatus recited in claim 1, further comprising a time counter for making several caster and camber angle measurements in time multiplex operation.

15. The apparatus recited in claim 1, wherein said projector includes a light source comprising a halogen lamp with a cold light mirror.

16. The apparatus recited in claim 15, wherein said projector includes an objective lens, and further includes a lens which images the helix of said halogen lamp in the vicinity of said objective lens.

17. The apparatus recited in claim 1, wherein said projector includes a light source comprising a stroboscopic lamp.

* * * * *